United States Patent
Viot et al.

(10) Patent No.: US 11,389,827 B2
(45) Date of Patent: Jul. 19, 2022

(54) METHOD OF COVERING A PLASTIC SURFACE WITH A PERMANENT COATING

(71) Applicant: Compagnie Plastic Omnium, Lyons (FR)

(72) Inventors: Frédéric Viot, Sainte Julie (FR); Sophie Vidal, Sainte Julie (FR); Jérôme Brizin, Sainte Julie (FR); Julien Guyot, Sainte Julie (FR); François Virelizier, Sainte Julie (FR)

(73) Assignee: Compagnie Plastic Omnium, Lyons (FR)

( * ) Notice: Subject to any disclaimer, the term of this patent is extended or adjusted under 35 U.S.C. 154(b) by 445 days.

(21) Appl. No.: 16/715,866

(22) Filed: Dec. 16, 2019

(65) Prior Publication Data
US 2020/0188955 A1 Jun. 18, 2020

(30) Foreign Application Priority Data
Dec. 18, 2018 (FR) ................... FR1873258

(51) Int. Cl.
*B05D 3/10* (2006.01)
*C08J 5/12* (2006.01)
(Continued)

(52) U.S. Cl.
CPC ............. *B05D 3/101* (2013.01); *C08J 5/124* (2013.01); *C08J 7/042* (2013.01); *C09D 5/002* (2013.01);
(Continued)

(58) Field of Classification Search
CPC ............ B05D 3/101; C08J 5/124; C08J 7/042
See application file for complete search history.

(56) References Cited

U.S. PATENT DOCUMENTS 4,044,177 A * 8/1977 Paulus ............... B05D 5/02
427/270
4,358,482 A 11/1982 Jubelt
(Continued)

FOREIGN PATENT DOCUMENTS

CA 2272195 A1 11/2000
CA 2727081 A1 1/2010
(Continued)

OTHER PUBLICATIONS

Yuanjun, Li; "Automotive Painting Technology"; Beijing Institute of Technology Press; ISBN 978-7-5640-1551-0; Jun. 2008; pp. 98-99.

(Continued)

*Primary Examiner* — Nathan T Leong
(74) *Attorney, Agent, or Firm* — Shackelford, Bowen, McKinley & Norton, LLP

(57) ABSTRACT

The invention particularly relates to a method of applying a permanent coating to a plastic surface of a first part, comprising the following steps:
applying to said plastic surface a layer of a polyamide-based hot-melt material,
maintaining this layer of hot-melt material on said plastic surface for a period of time ranging from a few minutes to several hours,
removing this layer of hot-melt material from this plastic surface; and
applying a permanent coating to said surface, said permanent coating being based on polyurethane, an epoxy resin or polyesters, a polycarbonate and/or an acrylic resin; as well as the use of such a method in the automotive industry.

20 Claims, 1 Drawing Sheet

(51) Int. Cl.
*C08J 7/04* (2020.01)
*C09D 5/00* (2006.01)
*C09D 133/00* (2006.01)
*C09D 175/04* (2006.01)
*C09D 179/02* (2006.01)
*C09J 5/02* (2006.01)
*C09J 175/04* (2006.01)

(52) U.S. Cl.
CPC ......... *C09D 133/00* (2013.01); *C09D 175/04* (2013.01); *C09D 179/02* (2013.01); *C09J 5/02* (2013.01); *C09J 175/04* (2013.01); *C08J 2323/12* (2013.01); *C08J 2323/16* (2013.01); *C08J 2433/00* (2013.01); *C08J 2475/04* (2013.01); *C08J 2479/02* (2013.01); *C09J 2423/048* (2013.01); *C09J 2475/00* (2013.01)

(56) References Cited

U.S. PATENT DOCUMENTS

| | | | |
|---|---|---|---|
| 5,079,822 | A | 1/1992 | Arai et al. |
| 8,586,149 | B2 | 11/2013 | Holubka et al. |
| 2004/0238985 | A1* | 12/2004 | Beckord ............... B05B 12/24 264/37.33 |
| 2007/0207269 | A1 | 9/2007 | Woodhall et al. |
| 2010/0167038 | A1 | 7/2010 | Linnenbrink |
| 2011/0104394 | A1 | 5/2011 | Beier et al. |
| 2015/0267410 | A1 | 9/2015 | Hubbard |
| 2018/0036766 | A1 | 2/2018 | Vidal et al. |
| 2019/0105848 | A1 | 4/2019 | Zhang et al. |

FOREIGN PATENT DOCUMENTS

| | | | |
|---|---|---|---|
| CN | 1520340 | A | 8/2004 |
| CN | 102423948 | A | 4/2012 |
| CN | 102635758 | A | 8/2012 |
| CN | 203979042 | U | 12/2014 |
| CN | 106987210 | A | 7/2017 |
| CN | 107298949 | A | 10/2017 |
| CN | 210611713 | U | 5/2020 |
| DE | 102009020264 | A1 | 11/2010 |
| EP | 2319630 | A1 | 5/2011 |
| EP | 2868391 | A1 | 5/2015 |
| EP | 3015854 | A1 | 5/2016 |
| EP | 3031596 | A1 | 6/2016 |
| FR | 2894531 | A1 | 6/2007 |
| JP | H04290723 | A | 10/1992 |
| JP | H08141491 | A | 6/1996 |
| JP | 2004188283 | A | 7/2004 |
| JP | 2007144376 | A | 6/2007 |
| JP | 2014028357 | A | 2/2014 |
| WO | WO-2005075747 | A1 | 8/2005 |
| WO | WO-2006058783 | A1 | 6/2006 |
| WO | WO-2010008749 | A1 | 1/2010 |
| WO | WO-2016097654 | A1 | 6/2016 |
| WO | WO-2017181042 | A1 | 10/2017 |

OTHER PUBLICATIONS

The State Intellectual Property Office of the People's Republic of China; First Office Action for Chinese Patent Application No. 201580073034.6; dated Mar. 3, 2020; 12 pages.
Japanese Patent Office; Notice of Reasons for Rejection for Japanese Patent Application No. 2017-551370; dated Jul. 16, 2019; 9 pages.
Henkel Ltd.; "Product Selector: Industrial Adhesives, Sealants and Surface Treatment Solutions"; www.loctite.co.uk; Jan. 2010; 142 pages.
3M Industrial Adhesives and Tapes Division; "Design & Production Guide for Application Success: Bonding, sealing, attaching, mounting, laminating, and fastening"; www.3M.com/adhesives; Jan. 2008; 100 pages.
Sika Automotive GmbH; "SikaMelt®-9636 UV: UV-stabilized clear plastic packaging adhesive"; Product Data Sheet; version 3; www.sika-automotive.de;www.sika.com; Jul. 2010; 2 pages.
Acrom; "Product Information: ACROMELT PU 26"; www.acrom.fr; accessed Sep. 2020; 1 page.
Acrom; "Technical Data Sheet: ACROMELT ST 94"; www.acrom.fr; TDS, No. 2; Dec. 2014; 1 page.
H.B. Fuller Construction Products Inc.; "Foster: 83-13HM ZP: Product Data Sheet"; www.fosterproducts.com; Foster PDS85-13 R0916; accessed Sep. 2020; 2 pages.
Moistech Corp.; "Hot Melt Adhesive Thickness"; https://www.moisttech.com/applications/hot-melt-adhesive-thickness/; accessed Sep. 2020; 2 pages.
Jowat Adhesvies; "Jowat-Toptherm 232.30"; https://www.jowat.com/en-US/adhesives/hot-melt-adhesives/jowat-toptherm-23230/; accessed Sep. 2020; 2 pages.
Saidman, Larry; "Delivery: Hot Melt Application Technology"; ASC Hot Melt Short Course; adhesives.org; Oct. 2005; 37 pages.
SIKA; "Product Data Sheet: SikaMelt®-600 (former SikaMelt®-9600)"; Product Data Sheet, version 01.01; dnk.sika.com; Sep. 2019; 2 pages.
Sika; "SikaMelt®-677"; industry.sika.com/en/home/textiles-and-consumables/sikamelt-677.html; accessed Sep. 2020; 4 pages.
Nordson Corporation; "Universal™ Summit® Nozzles"; nordson.com; NWL-11-5709; Oct. 2011; 2 pages.
Sika Corporation; "SikaMelt®-9181: Moisture Curing Polyolefine Hotmelt for Lamination Bonding"; Provisional Technical Data Sheet, version Jun. 2006; Jun. 2006; 2 pages.
Sika Automotive GmbH; "SikaMelt®-9632"; Product Data Sheet, version Aug. 2007; Aug. 2007; 2 pages.

* cited by examiner

[Fig. 1]
| | RC<br>Cohesive Fracture |
|---|---|
| | RCS<br>Superficial Cohesive Fracture |
| | RS<br>Support Fracture |
| | RSD<br>Delaminating Support Fracture |
| | RA<br>Adhesive Fracture |
| | RAR*<br>Tearing Fracture of the Coating |
| | RCP<br>Cohesive Fracture with Peeling |
* The designation should be followed by the nature of the coating (primer, varnish, painting, etc.).
[Fig. 2]
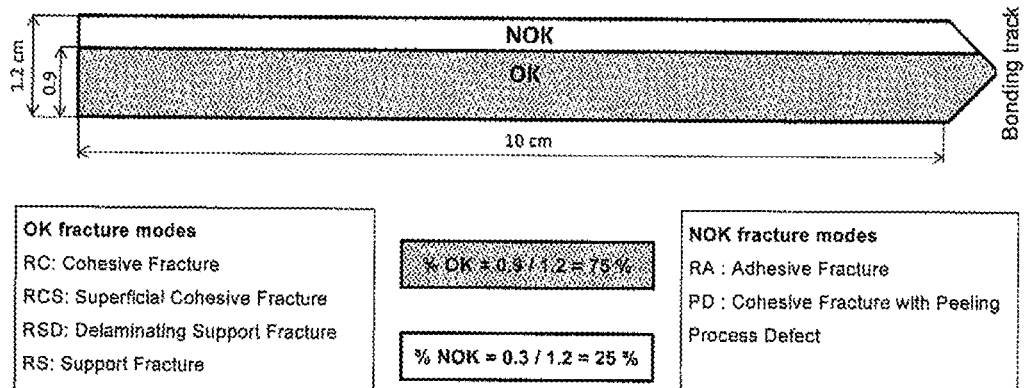

METHOD OF COVERING A PLASTIC SURFACE WITH A PERMANENT COATING

FIELD OF THE INVENTION

The present invention relates to a method for activating a plastic surface, and more particularly a plastic vehicle part, in order to improve adhesion to coatings such as glues, paints or varnishes.

PRIOR ART

In the manufacture of motor vehicles, some parts are wholly or partly made of plastic material and in particular polypropylene. They often consist of a set of parts, some of which have visible portions. It is common for some of the surface of these parts to be coated with various coatings, such as decorative coatings such as a paint film. An example of such a piece is a hatchback outer skin assembled on an inner liner, a spoiler, a side door, a hood, a roof, etc. It is also common that a portion of a surface of these parts is a fastening area intended to be assembled by bonding this area to another part to form an assembled part.

The bonding of such parts must be particularly durable because of their use as component parts of motor vehicles. In conventional bonding processes in this industry, the plastic material surface of the bonding zone is generally activated, that is to say treated by physico-chemical methods intended to position, on the surface of the plastic, chemical species that promote adhesion with organic compounds such as glues, paints or varnishes based on polyurethane, epoxy resins or polyesters, polycarbonates or acrylic resins. These treatments of the surface to be bonded are well known in the automotive industry: they are flaming, the application of UV rays, ozone, corona discharge or plasma. Such techniques are described, for example, in the patent publications EP3015854A1 and WO2016/097654 of Plastic Omnium, or in U.S. Pat. No. 8,586,149. The flaming technique is most commonly used to improve adhesion properties before applying layers of paints or varnishes. This is also generally recommended in the instructions for use of most coatings for the automotive industry.

However, the conditions to be fulfilled for flaming to be effective and to lead to a really satisfactory adhesion are still largely empirical. Despite the techniques used, defects resulting from a problem of poor adhesion are very common in the industry and may be present in more than 10% of the treated surfaces.

There is therefore a need to identify a method for improving the adhesion of a plastic surface, and especially a polypropylene base, to an organic compound and in particular a glue. Polypropylene (PP) is one of the most widely used plastics in particular because of its simplicity of manufacture and molding and these rheological properties.

DESCRIPTION OF THE INVENTION

In a very unexpected manner, it has been established that a physicochemical treatment comprising the temporary application of a polyamide-based hot melt material on a plastic surface to be glued, which may or may not be followed by a suitable heat treatment (for example, heating), the latter preceding removal of the hot melt material from said surface to be bonded, makes it possible to activate this surface in a particularly effective manner and to obtain the adhesion of a permanent coating to this surface significantly superior to those obtained through the use of other activation methods. This is particularly the case when the coating is a permanent glue.

According to one embodiment, the invention relates to a method for applying a permanent coating to a plastic surface of a first part, comprising the following steps:
applying to said plastic surface a layer of a hot-melt material preferably based on polyamide,
maintaining this layer of hot-melt material on said plastic surface for a period of time ranging from a few minutes to several hours,
removing this layer of hot-melt material from this plastic surface; and
applying a permanent coating on said surface, said permanent coating being based on polyurethane, an epoxy resin or polyesters, a polycarbonate and/or an acrylic resin.

Very advantageously, the method according to the invention does not include a step of activation of the plastic surface or treatment for this purpose after removal of the layer of hot melt material. It is thus possible to dispense with the use of an activation step such as flaming, the application of UV rays, ozone, corona discharge or plasma. In particular, according to a preferred aspect of the invention, no flaming step of the plastic surface is implemented or performed. It is also preferred to avoid such activation steps (and in particular flaming) before affixing the permanent coating to the plastic surface.

The part comprising a plastic surface is preferably a part based on a material or a thermoplastic material. These thermoplastic materials may include acrylonitrile butadiene styrene (ABS), polyamides such as polycaprolactams: [NH—(CH2)5-CO]n(PA-6), and polyhexamethylene adipamides: [NH—(CH2)6-NH—CO—(CH2)4-CO]n(PA-6,6), polycarbonates (PC), high density polyethylenes (PE-HD), low density polyethylenes (PE-LD), amorphous or crystalline, poly(ethylene terephthalates) (PET), poly(methyl methacrylates) (PMMA), polypropylenes (PP), "crystal" polystyrenes (PS), rigid polyvinyl chloride (PVC) and mixtures thereof. Polypropylene (PP)-based plastic is one of the most widely used plastics in particular because of its simplicity of manufacture and molding and these rheological properties. In addition, a material based on polypropylene or based on polypropylene/polyethylene gives particularly satisfactory results.

It should be noted that the term "X-based" refers to a material whose main component is X. This expression can also but not necessarily refer to the composition of a material whose majority component is X. Thus, for example, this expression denotes a material comprising at least 35% by weight of X, preferably at least 40%, more particularly at least 50% or even at least 60% of X by weight relative to the total weight of the composition.

It should also be noted that according to the common practices of the technical field in question, that is to say the manufacture of plastic vehicle parts, the proportions given in this description of a composition are, by default, given in terms of weight relative to the total weight of the composition in question.

This plastic material advantageously comprises a mineral or organic, or even vegetable filler, in the form of powder or fibers. This filler may be, for example, quartz, mica, kaolin, calcium phosphate, feldspar, steatite, chalk, talc, carbon black of synthetic silica, barium sulfate, barium ferrite, wood flour or fruit bark, cellulose pulp, glass fiber, widely used hollow glass microspheres, synthetic silica, nanoscale clay, flax, etc. as well as mixtures thereof. This filler is usually talc. This filler may vary from 1 to 75% by weight depending on the nature of the filler, for example from 10 to 45%, more particularly from 30 to 40% by weight relative to the weight of the plastic material.

The plastic may also comprise various additives and in particular a significant proportion (for example from 20 to 24% by weight) of an elastomer (having an impact resistance function), for example an EPR type copolymer (Ethylene Propylene Rubber) and/or EPM type (ethylene-propylene-diene monomer).

Preferably, the plastic comprises an antioxidant or anti-UV compound.

1) The antioxidant compounds are, for example, selected from the group of phosphites such as IRGAFOS 168, that is to say Tris(2,4-ditert-butylphenyl)phosphite CAS N°: 31570-04-4, MM 646.9 g/mol and/or hindered phenolic ring compounds such as IRGANOX 1076, i.e., octadecyl-3-(3, 5-di-tert.butyl-4-hydroxyphenyl)-propionate, CAS N°: 2082-79-3; and/or 2) anti-UV compounds, are for example from the family of hindered amines.

When at least one such antioxidant compound and/or anti-UV compound are present, for example in proportions ranging from 0.5 to 5% by weight, the method according to the invention is particularly effective.

Advantageously, in the method according to the invention, the plastic of the plastic surface comprises, essentially comprises, or consists of a mixture of polypropylene (possibly polyethylene), talc, ethylene propylene rubber and at least one anti-UV or antioxidant, for example an anti-UV and/or an antioxidant as mentioned in the previous paragraph.

One step of the method according to the invention comprises the application on said plastic surface of a layer of a hot melt material preferably based on polyamide, and preferably comprising essentially polyamide.

The material is advantageously of hot-melt type, that is to say an adhesive that becomes fluid under the action of heat and can be easily applied to the liquid state. Once applied, the glue re-solidifies while cooling, adhering to the surface without leaving a gap. This cooled glue can be removed quickly and easily from the part due to its residual flexibility and good cohesion at room temperature, making it possible to remove the layer, preferably in one piece, without its fragmenting into many pieces. This glue can be used to make a marouflage of the plastic surface and perform a protective function of this area while other surfaces are the subject of other treatments, such as painting. This hot-melt glue is preferably non-crosslinkable, that is to say that by heating it again, it becomes fluid again and can easily be reused. In general, hot melt glues are liquid from 110° C. and are cured below 90° C.

The hot-melt material thus preferably comprises a high proportion of polyamide, and is preferably composed essentially of polyamide. For example, it comprises more than 90%, preferably at least 95% and even at least 98% by weight of polyamide. It may optionally comprise a small proportion of talc, for example from 0 to 5% by weight, and/or an anti-caking agent (for example in a proportion of about 0.1% by weight). In particular, it is preferable that this polyamide does not comprise structural material such as fibers. The polyamide may be a polyamide comprising a carbon chain, preferably alkyl, branched or unbranched, C10 to C14, or a mixture of such polyamides. Preferably, the polyamide comprises, is based on, consists, or consists essentially of a C12 polyamide. A particularly interesting example of hot-melt glue that can be used is a polyamide-based glue such as that marketed by Henkel under the name "TECHNOMELT PA2420", or the glue marketed by Henkel under the reference "HENKEL 6208".

According to an advantageous aspect of the invention, the hot-melt material that formed this solidified layer during the implementation of the method according to the invention can be reused. This reuse may include a remelting step at a temperature above 140° C. in a melter. Cleaning of the material to be reused can be provided, for example by filtration of the material and/or a step of adding a small quantity of talc, from 0.5 to 3%, to allow simple granulation of the recycled material before its storage for reuse. Thus, the polyamide-based hot-melt material may have been recycled, which is advantageous from an environmental point of view.

Application of the hot-melt material to the plastic surface is generally accomplished by depositing the molten material. The thermoplastic activation material is advantageously melted at a temperature below that recommended. For example, in the case of using a C12 polyamide, this temperature is preferably 160° C. to 170° C., in particular 165° C.

This removal is preferably performed automatically using a configurable robot so as to predefine the width and thickness of the layer. It is generally recommended that the width of the layer be greater than or equal to 8 mm, for example its width may be close to 20 mm (with possibly more run off in places). The thickness of the layer is generally between 1 and 3 mm, for example 1.5±0.5 mm. These parameters correspond to the current dimensions of bonding surfaces in the automotive industry.

Once deposited in the form of a layer on the surface to be bonded, the hot-melt material is advantageously allowed to cool, for a period of time ranging from 15 seconds to 10 minutes, preferably from 30 seconds to one minute 30 seconds, and generally about 1 min.

Once the deposit of the hot melt material directly on the plastic surface is done, the contact is maintained between these two materials so as to allow the activation of the plastic by the thermoplastic material. The period of contact time may vary depending on the nature of the material from a few minutes (for example (2 minutes) to several hours (for example 5 hours), or even several days. However, it has been determined that a period of at least about 2 hours gives good results, especially when the substrate is based on PP and/or PE. Advantageously, the contacting step comprises a heating step. The temperature may vary but advantageously it should not exceed the melting temperature of the hotmelt material and should preferably be less than this. Thus, this temperature is advantageously chosen from 50° C. to 100° C. for example from 60° C. to 90° C. A temperature of about 80° C.±5° C. is particularly preferred. The heating period can vary from hours to minutes. However, a period ranging from 0.25 to 2 hours (in particular approximately 0.5 hours) makes it possible to obtain satisfactory activation results. In the case where a heating step is performed, a cooling period of a time equivalent to the heating period (for example, half an hour) is generally recommended. In such a case, the total pause time can then vary from 1 to 2 hours.

In a particularly advantageous manner, the hot-melt material may, in addition to enabling the activation of the plastic surface, protect this surface. For example, if this surface is a one-piece bonding track, the remaining surface of which must be painted. The hot-melt material can protect the bonding track when applying layers of paints or varnishes, and particularly preferably, protect the plastic surface from any flaming performed in order to activate the surfaces to be painted. Similarly, the heating step can advantageously, in addition to allowing the activation of the plastic surface, allow the drying and/or curing of a paint film disposed around said surface. Such paint films are typically composed of a succession of coatings of the Primer/Base/Varnish type. For example, the primer may be of the polyurethane or acrylic type, and be arranged in a layer with a thickness ranging from 5 to 20 μm, conductive or not. The base may be of the urea, or polyurethane or acrylic type and the layer of this coating may be from 5 to 40 μm thick. The varnish may be of the polyurethane, acrylic, siloxane type or a mixture of these compounds, and have a thickness of 10 to 40μm.

Once the heating step has been carried out, the layer of hot-melt material is removed, preferably after cooling (for example after 5 to 30 minutes after the end of the heating). This removal is performed either by manual traction or by mechanical traction. The activation of the surface is thus obtained, and it can be coated with the permanent coating. Before coating the plastic surface with the coating, it may be advantageous to clean said surface, for example by means of a pad or wipe soaked with a cleaning agent such as an alcohol (for example isopropyl) alcohol.

The permanent coating may be chosen from coatings based on polyurethane, an epoxy resin or polyesters, a polycarbonate and/or an acrylic resin. However, particularly satisfactory results have been obtained when using a polyol/isocyanate-based coating. This type of two-component coating is generally intended for high-strength bonding of plastic parts.

Preferably, said permanent coating is a glue. Thus, the method according to the invention is particularly suitable for bonding a plastic surface using a permanent glue based on polyurethane, an epoxy resin or polyesters, a polycarbonate and/or an acrylic resin. In particular, the glue is a two-component polyurethane glue based on polyol(s) and isocyanate. The term isocyanate also includes the isocyanate derivative(s), such as diisocyanate. In such glues, the relative proportion by volume v/v of polyols/isocyanate is generally 1±10%, for example 50/50. The method can thus allow the permanent assembly by gluing of a second piece with the first piece, preferably to allow assembly and/or manufacture of a motor vehicle part.

The permanent coating can be deposited on the plastic surface by robot or by any other means. It should be noted that, for use in the manufacture of motor vehicle parts, a particularly contemplated use, the permanent coating track, in particular the deposited bonding track, is advantageously of a thickness of 1.5±0.5 mm and of a width of more than 8 mm to obtain satisfactory results. When the method is a gluing method, the part to be bonded to the plastic surface is brought into contact with the latter and the permanent coating (in this case a glue) which is affixed to it and these parts are kept in contact under pressure for the time necessary for the bonding to take place, for example for a period of 30 s to 5 minutes.

Advantageously, only a step of cleaning the plastic surface occurs between the removal of the thermoplastic material and the application of the permanent coating.

The method according to the invention makes it possible to obtain substantially better results than when other activation methods, such as flaming, are used. The particularly positive results in terms of the nature of the adhesive break during delamination of the method according to the invention are exemplified in the present application. However, an improvement of the mechanical shear strength carried out according to the DIN EN 1465: 2009 standard test: is also obtained, especially for plastic parts assembled by gluing according to the method of the invention.

Another object of the invention is the use of a polyamide-based hot-melt material for the temporary treatment of a plastic surface and preferably where said plastic is based on polypropylene, or based on polypropylene/polyethylene, and further comprises an antioxidant and/or anti-UV compound. This use and the materials are preferably as previously or subsequently described.

The invention therefore also relates to the use of a method as described above for manufacturing a part, and in particular, an outer part of a motor vehicle, such as a hatch skin, a front or back bumper skin; a front or rear fender; a pillar; a side skirt; a side door; a cap; a convergent part such as a roof spoiler; a roof; as well as the parts obtained by such a method.

FIG. 1 shows the different types of cohesive or adhesive failures.

FIG. 2 shows how to measure the proportion of acceptable cohesive failure (OK) with respect to the proportion of unacceptable adhesive failure (NOK).

EXAMPLE 1

Activation of a Surface of a Polypropylene Material Constituting a Car Part: a Tailgate Door Panel A visible body part, in this case a tailgate door panel, is used. This panel is intended to be fastened by gluing on an assembly comprising a hatch skin and a box. This part consists mainly of polypropylene and is obtained by injection molding according to standard techniques in the automotive industry. The polypropylene (PP) material EBP830 from the company TOTAL with the following formulation: 46% of PP, 22% of EPR (ethylene-propylene rubber), 33% of talc, the remaining mass comprising various additives such as anti-UV and in particular IRGAFOS 168 and IRGANOX 1076.

A strip of thermoplastic material based on polyamide C12 (PA12) is deposited using a robot on a part of the surface of the piece. This part corresponds to the gluing track, that is to say where the glue will be deposited to secure the piece with another part of the vehicle. The thermoplastic activating material used is a TECHNOMELT PA2420 thermoplastic hot-melt resin essentially comprising a polyamide, with a small filler of talc of approximately 1% by mass relative to the mass of the resin.

The thermoplastic activating material is melted at 165° C. automatically and, once deposited as a layer on the surface to be bonded, is allowed to cool for about 1 minute. The portion of the part to be painted is then degreased with isopropyl alcohol (IPA) and then after evaporation (about 30 seconds) it is activated by flaming under stoichiometric conditions with a propane/air mixture.

This activated part is then painted according to the methods used in the automotive industry. More particularly, a robot performs a chain deposition of 3 successive layers of component to form a paint film. These layers consist of a first layer, or primer, of the polyurethane type, a second layer, or base, of the melamine type, then a third and last layer, or varnish, of a mixed polyurethane/acrylic type.

The part is then heated at 80° C. for ½ h. The pause time in particular enables activation of the surface to be bonded and the heating has the advantage of drying and cross-linking the layers of paints.

At the outlet of the paint line, that is to say after 5 to 30 minutes after stopping heating, the layer of thermoplastic material based on PA12 is removed by manual traction. The surface it covers is then cleaned with an IPA wipe. A permanent two-component polyol/isocyanate adhesive for high-strength bonding of plastic parts is robotically deposited on the bonding track of the tailgate door panel which has been protected. The deposited bonding track has a thickness of 1.5±0.5 mm and a width of more than 8 mm. The door panel is brought into contact with the tailgate door and the two parts are held in position under pressure for 1 minute at room temperature. This example is repeated for a part of the same type but corresponding to a different vehicle model. Thus two separate panels, V1 and V2, are obtained. The materials of the panels V1 and V2 are identical.

EXAMPLE 2

Comparative Example Between the Process of the Invention and the Use of a Masking Tape To demonstrate the activation of the bonding surface of the part, an experiment was conducted on a part of different shape but with the material constituting it being the same as that used in Example 1: a spoiler. The use of parts of different shapes has been done only for practical reasons and this difference in shape cannot have any impact on the results of the test. This example is performed on two spoilers, each of which corresponds to the cited vehicle models V1 and V2. Thus two separate spoilers V1 and V2 are obtained.

The method described in Example 1 was repeated with a TESA brand adhesive tape which was used in place of the PA12 material, to temporarily mask part of the workpiece surface. This adhesive strip consists of a paper support on which there is a layer of adhesive of the rubber/acrylic glue type. The process described in Example 1 was repeated identically until the removal of the adhesive tape. To perform the comparative test, the panels and spoilers were bonded to other parts forming the tailgate, that is to say, a tailgate skin and a tailgate box.

The final glue used to bond the activated bonding surface to another part is of the polyurethane two-component type (polyol/isocyanate) typically used in the automotive industry. In this example, the permanent adhesive used is marketed under the name ADEKIT A257BK/H6257 (two-component Polyurethane Adhesive Low Modulus-High Flexibility) by AXSON FRANCE—SikaAxson.

The gluing process is as follows: the bonding tracks of the tailgate skins and tailgate boxes are cleaned with wipes impregnated with a 70/30 by volume mixture of isopropyl alcohol/deionized water of the same type as above.

The bonding surface is activated by flaming using the same technique and conditions as those described above for the application of the film. Then the glue is placed on the spoiler bonding track by means of a robot. The spoiler is then brought into contact with a skin/tailgate assembly and the two parts are held in position for 1 minute and then allowed to dry for 2 hours.

To make it possible to confirm the adhesion activator effects of the process according to the invention, the examples were repeated five (5×) times on each model V1 and V2. The results presented in the table are the averages of the results obtained. The test carried out is a compliance test consisting in delaminating the bonded parts using a mechanical stress. Once this delamination (peeling) has been carried out, it is possible to qualify the adhesion performance of the structural bonding by rating the fracture surfaces on the delaminated bonded product. This test can be done on the motor vehicle parts themselves (as in the example presented) or on specimens, that is to say tabs of standardized dimensions (for example 125×25 mm).

The test must be done under standard conditions. It must be performed in a room where the temperature is between 15 and 30° C. The glue must be fully cross-linked (in this case the drying period is 7 days at room temperature about 20° C.) and the parts must be stored beforehand for a minimum of 2 hours in this environment before the test is performed. For parts tested in the initial state (H0), the part is installed on a flat, stable and clear work surface, stable and clear (established type). The workpiece is held with clamps (at least two to prevent rotation of the workpiece). The parts undergoing curing (type H7, H14 . . . ) are generally cut into several zones of 20-30 cm in length all along the bonding track to avoid crowding inside equipment associated with curing (drying chambers, climatic chambers . . . ).

In both cases, it is necessary to penetrate the bonding area using a chisel. Then tap the chisel with the hammer perpendicular to the glue bead until the chisel passes through the bead. Thus the starter is created. Note: the finer the tool is, the easier it will be to pass through the bead; if a chisel is too thick it may damage the substrates. The part can then be delaminated. To do this we insert the chisel against one of the bonded surfaces parallel to the bead of glue and then tap the chisel by means of the hammer to take off the other bonded surface. We progress in the same way over several centimeters so that the peeled area is large enough, then apply leverage with the chisel to achieve the decohesion between the two bonded surfaces. This process is repeated on all the bonded parts of the test piece so as to obtain complete delamination.

On certain parts, or portions thereof, it is not easy to achieve leverage with chisels. It is therefore necessary, by means of the hammer, to penetrate the bead of glue with the chisel in several places, and to repeat the operation with the second chisel in a neighboring zone. In any case it is advisable to limit the degradation of the bead of glue by direct contact with the tools, although it is possible to lean slightly on the bead of glue. Any bead surface that has been degraded by a tool will not be taken into account in the rating of the fracture surfaces. The rating, or analysis, of the fracture surfaces is made with reference to the standard ISO10365:1992. This makes it possible to observe the nature of the fracture and then to quantify it so as to arrive at a percentage of compliance. There are thus 7 types of fracture: the cohesive fracture (RC), which is sought, which occurs in the body of the adhesive material, the adhesive fracture (RA), to be avoided, which occurs at the interface with the support. Acceptable superficial cohesive fracture (RCS) is an intermediate type that occurs in the body of the adhesive but is positioned near the interface with the bonded walls. When the support breaks, the fracture is of the support fracture (RS) or delaminating support fracture (RSD) type, when only a part of the thickness of the material is torn off. Cohesive fracture with peeling (RCP) describes the occurrence of cohesive fracture accompanied by partial peeling of the support adhesive (i.e., partial RA thereof). Finally, in the case of a laminated support having a coating, the tearing fracture of the coating (RCP) describes the fracture by tearing of the coating of the support.

In this test, the fracture surfaces are measured according to their typologies and classified into RC, RCS, RS, RSD, RA, RAR and RCP. RC, RCS, RS, RSD fractures (or cohesive fractures) are acceptable while RA, RAR, and RCP fractures are not. The measurement is made by taking into account, over a given length, for example 10 cm, the proportion of acceptable cohesive fracture with respect to the proportion of unacceptable fracture, as represented in FIG. 2. Note that when the width of the bonding track is greater than 1 cm, an acceptable seal present on a width of 1 cm is rated as 100%.

Table 1 shows in percentage terms the cohesive fracture, i.e. 1) between the spoilers and the hatchback skin/box assembly, i.e. 2) between the panels and the tailgate skin/box assembly. This test makes it possible to establish the behavior of the glue.

The H0 tests were carried out on assemblies that had dried for 7 days.

The H7 tests were carried out on assemblies which, after 7 days of drying, were cured by placing them in an oven for 7 days, put in an oven in a wet poultice in a closed bag with cotton soaked in water. The temperature of the oven is 70° C. (100% humidity). The parts are also subjected to a thermal shock: they are subjected for 2 h at a temperature of −20° C. This thermal shock is performed after the oven phase and then there is a return to room temperature for mechanical tests.

The % compliance is a value representing the percentage of the surface of the bonding track after delamination having an acceptable type of fracture (surfaces) relative to the rest of the bonding surface.

Table 1 describes the results of this comparative test.

TABLE 1

| Model | Part number and type of test performed on it | % spoiler compliance (prior art) | % panel compliance (Invention) |
|---|---|---|---|
| V1 | H0_1 | 2 | 67 |
|  | H0_2 | 1 | 88 |
|  | H7_1 | 0 | 81 |
|  | H7_2 | 0 | 87 |
|  | H7_3 | 0 | 85 |
| V2 | H0_1 | 0 | 87 |
|  | H0_2 | 4 | 83 |
|  | H7_1 | 0 | 88 |
|  | H7_2 | 0 | 82 |
|  | H7_3 | 0 | 88 |

Thus the parts assembled according to the method of the invention have a very low adhesive fracture rate and, in the vast majority of cases, one that is substantially beyond the acceptable limit in the automotive industry. This limit being at least 80% of cohesive fracture in the initial state and at least 70% of cohesive fracture after aging. This level of acceptability is much higher than that obtained using a flame activation step as used in the prior art.

TECHNOMELT PA 2420 resin is sold by HENKEL AG & Co. KGaA, 40191 Düsseldorf, GERMANY. Its recommended application temperature is 180 to 201° C. and it has the following characteristics in February 2013:

| TECHNICAL DATA | |
|---|---|
| Softening point, ° C. ASTM E28 (in glycerin): | 123 to 131 |
| Melt viscosity at 180° C., mPa · s | 3,000 |
| Melt viscosity at 190° C., mPa · s | between 1,500 and 2,500 |
| Melt viscosity at 210° C., mPa · s ASTM D 3236 (RVT, pin 27) | 1,000 |
| Density, g/cm$^3$, ASTM D 1963 | 0.97 |
| Force, N/mm$^2$, ASTM D 638 | 5 |
| Resistance to fracture, N/mm$^2$, ASTM D 638 | 3.5 |
| Shore D hardness, ASTM D 2240 | 32 |
| Elongation, %, ASTM D 638 | 400 |
| Module E 2%, N/mm$^2$, ASTM D 638 | 70 |
| Chuck test 100%, ° C., ASTM D 3111 | −5 |

The invention is not limited to the embodiments presented here and other embodiments will become clearly apparent to a person skilled in the art. In particular, it is possible to activate surfaces that are not intended to be glued but intended to be painted. This is particularly the case for polyurethane-based coatings.

The invention claimed is:

1. A method of applying a permanent coating to a plastic surface of a first part, the method comprising:
    applying to the plastic surface a layer of a polyamide-based hot-melt material comprising C12 polyamide,
    maintaining this layer of hot-melt plastic material on the plastic surface for a period of time ranging from a few minutes to several hours,
    removing this layer of hot-melt material from this plastic surface; and
    applying a permanent coating on the surface, the permanent coating being based on at least one from the following:
    polyurethane;
    an epoxy resin or polyesters;
    a polycarbonate; or
    an acrylic resin.

2. The method of claim 1, wherein no flame treatment step on the plastic surface is carried out.

3. The method of claim 1, wherein the maintaining step comprises a heating step.

4. The method according to claim 1, wherein the hot-melt material is based on, consists, or consists essentially of a C12 polyamide.

5. The method according to claim 4, wherein the hot-melt material consists of a C12 polyamide.

6. The method according to claim 4, wherein the hot-melt material consists essentially of a C12 polyamide.

7. The method according to claim 1, wherein the first is based on a thermoplastic material selected from the group consisting of acrylonitrile butadiene styrene (ABS), polyamides, polycarbonates (PC), high-density polyethylenes (PE-HD), low-density polyethylenes (PE-LD), amorphous or crystalline poly(ethylene terephthalate) (PET), poly(methyl methacrylate) (PMMA), polypropylenes (PP), crystal polystyrenes (PS), rigid polyvinyl chloride (PVC), and mixtures thereof.

8. The method of claim 7, wherein the thermoplastic material is polypropylene-based.

9. The method according to claim 7, wherein the polyamide is selected from the group consisting of polycaprolactams: [NH—(CH2)5-CO]n (PA-6) and polyhexamethylene adipamides: [NH—(CH2)6-NH—CO—(CH2)4-CO]n (PA-6,6,).

10. The method of claim 1, wherein the plastic comprises one of an antioxidant compound and an anti-UV compound.

11. The method of claim 1, wherein the permanent coating is a glue.

12. The method of claim 1, wherein the first part is a motor vehicle part.

13. The method according to claim 1, wherein the hot-melt material consists essentially of C12 polyamide.

14. The method according to claim 1, wherein the permanent coating is based on polyurethane.

15. The method according to claim 1, wherein the permanent coating is based on an epoxy resin or polyesters.

16. The method according to claim 1, wherein the permanent coating is based on a polycarbonate.

17. The method according to claim 1, wherein the permanent coating is based on an acrylic resin.

18. The method according to claim 1, wherein the permanent coating is based on polyurethane and an epoxy resin or polyesters.

19. The method according to claim 1, wherein the permanent coating is based on a polycarbonate and an acrylic resin.

20. The method according to claim 1, wherein the permanent coating is based on an epoxy resin or polyesters and a polycarbonate.

\* \* \* \* \*